(Model.) 2 Sheets—Sheet 1.
J. H. BLACKMORE.
SULKY.
No. 262,923. Patented Aug. 22, 1882.
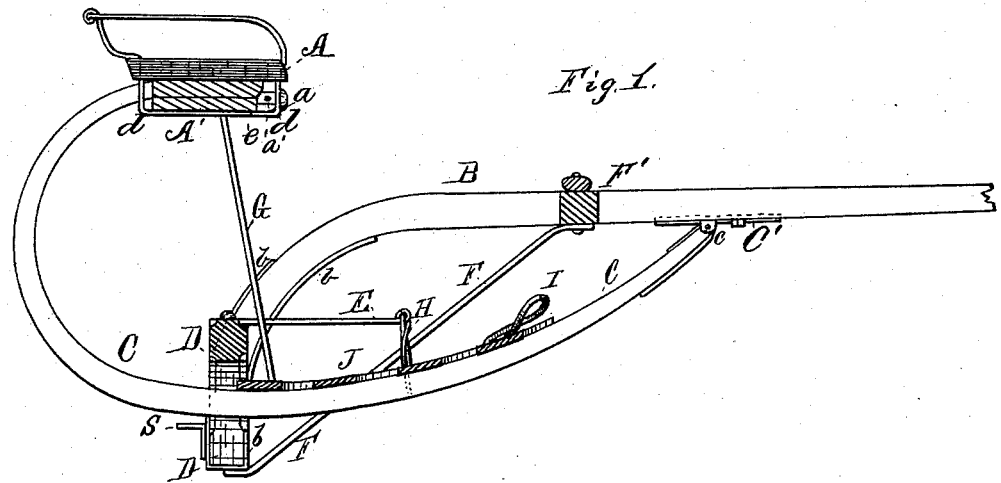
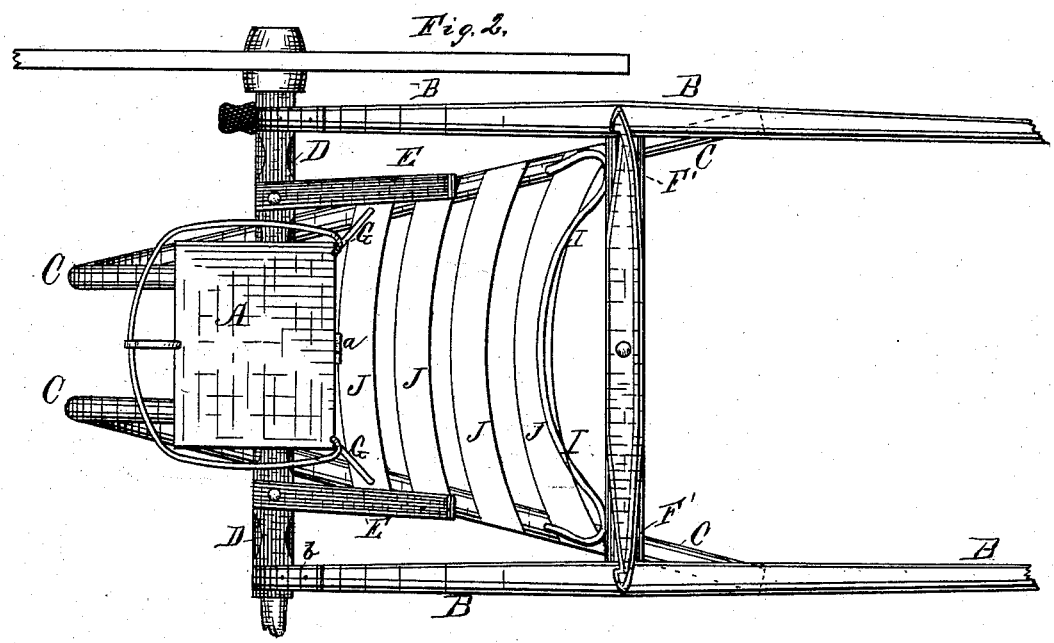
WITNESSES
Louis Johnson
C. E. Lewis
INVENTOR
James H. Blackmore,
By C. W. Johnson.
Attorney
N. PETERS. Photo-Lithographer, Washington, D. C.

(Model.)
2 Sheets—Sheet 2.
J. H. BLACKMORE.
SULKY.
No. 262,923. Patented Aug. 22, 1882.
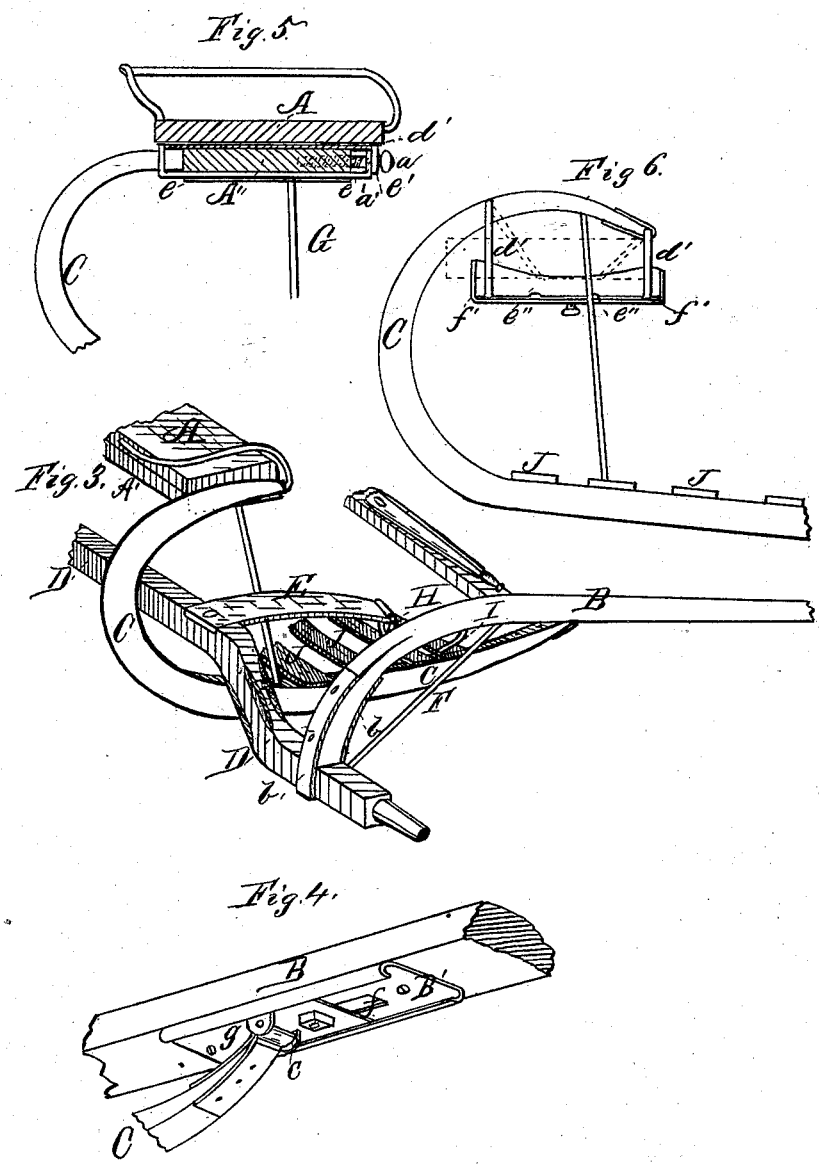
WITNESSES
Louis Johnson
C. E. Lewis
INVENTOR
James H. Blackmore
By—
J. W. Johnson
Attorney

UNITED STATES PATENT OFFICE.

JAMES H. BLACKMORE, OF DEFIANCE, OHIO.

SULKY.

SPECIFICATION forming part of Letters Patent No. 262,923, dated August 22, 1882.

Application filed September 12, 1881. (Model.)

*To all whom it may concern:*

Be it known that I, JAMES H. BLACKMORE, a citizen of the United States of America, residing at Defiance, in the county of Defiance and State of Ohio, have invented certain new and useful Improvements in Sulkies; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in sulkies or two-wheeled vehicles; and its object consists more especially in the arrangement and construction of the parts whereby wheels of an ordinary height may be used, and in which the seat of the driver is in such a position as to give him the best facilities for controlling the horse; also, in providing a sulky in which the shafts and axle will keep their position and will not rise and lower with the action of the springs.

On the annexed drawings, which illustrate my invention, Figure 1 is a side view of my improved sulky. Fig. 2 is a plan view. Fig. 3 is a perspective view. Fig. 4 is a perspective view of the coupling by which the supports are attached to the shafts. Fig. 5 is a sectional view of the adjustable seat, and Fig. 6 is a side view of a modification of the same.

On the annexed drawings, A represents an adjustable seat, which is secured to a support, A', by the loops $d$ and thumb-nut $a$. This support or block A' is rigidly attached to the ends of the platform and seat supporting bars C C, which are rearwardly and inwardly curved from said seat. The bars C C extend under the axle D of the vehicle, and are attached to said axle by the springs E E and connecting-loops H H at the ends of said springs. The bars C C are pivoted to the shafts B by the bearings C'.

The seat and platform supporting bars are provided with rearwardly-curved slats J, which form a platform and brace the bars C C, which diverge or extend outwardly from the seat to the ends at which they are secured to the shafts. By thus forwardly expanding the bars C C an enlarged and convenient space is provided in the rear of the sulky, through which the driver can readily mount the platform and seat from the rear. Near the last slat J of the platform is attached the foot-rest I, the outward ends of which are curved upward. This foot-rest is preferably made of one piece, and not only serves as a foot-rest, but also braces the supports.

The shafts B B are of ordinary construction, and are rigidly secured by means of the straps $b\ b$ to the lower part of the curved or upraised axle D. These shafts are braced to the axle by the rods F F, which extend from the axle to the cross-bar F' of the shafts.

The axle D of the vehicle is curved upwardly, or bent so as to raise its upper part from a point within the ends of the shafts to a point to which the springs E E are secured to the axle. By this construction greater play of the bars C C is allowed.

Immediately behind one end of the shafts, and at the lowest point of the axle, is attached a step, S, for mounting the platform and seat.

The seat A, as shown in Figs. 1, 2, 3, and 5, is secured to a block, A', by means of the bails $d$, which rest in longitudinal grooves $e\ e$ in said block and prevent lateral motion of the seat.

To the seat-board is attached an adjusting means, which consists of a plate, $d'$, with a downward-projecting flange, $e'$, which is perforated near its center for the reception of a thumb-screw, $a$, which is provided with a flange or pin, $a'$. This thumb-screw works in a suitable nut or threaded perforation in the block A'. By turning said thumb-screw the seat can be adjusted to properly balance the vehicle, according to the weight of the driver, or to suit the seat to the length of his legs and body.

Fig. 6 is a modification of the seat A, in which modification I dispense with the block A' and suspend the seat directly from the bars C C by the bails $d'\ d'$, which are journaled in the supports C C and extend laterally in grooves under the seat. The bails $d'$ are secured in the grooves $e''$ by band $f'$, which passes over the bails and secures the same against displacement. This band is provided with a thumb-screw, by which said band is tightened or loosened. By this arrangement a swinging seat is provided, which may be made stationary by placing the bails in the central grooves.

The ends of the supports C C are secured under the shafts, so as to be adjusted longitudinally by providing the straps, which terminate in eyes c c, with a suitable bolt, which passes through said eyes, and lugs formed on a sliding plate, g, which is movable longitudinally in the plate B', which is secured to the shafts B B. This sliding plate g is provided with a slot, f, and its play is limited by a bolt and nut. If desirable, this sliding plate may be secured, so as to be immovable, by tightening the nut upon said bolt, thus clamping the two parts to each other.

By providing the curved bars C C with an adjustable seat and stationary foot-rest I produce a sulky which is adapted to be used by persons having legs of different length, and by means of the adjustable clips upon the shafts and the movable loops connecting the bars with the springs, which springs are rigidly attached to the axle, I am enabled to properly adjust the bars C C and seat so that the weight of the driver may be properly adjusted upon the axle and shafts.

By the construction hereinbefore described and shown I produce a sulky in which it is easy to drive and ride, and which has an easy spring motion when in use, which springs, operating directly upon the seat and platform with foot-rest, do not disturb the position of the driver or annoy the horse. I also produce a vehicle in which there is no jerking or jolting felt by the driver, which vehicle consists of few parts with very low wheels, which adds materially to the strength of the same.

What I claim as new, and desire to secure by Letters Patent, is—

In a sulky, the curved bars C C, supporting an adjustable seat and foot-rest, said bars being provided with means for adjusting the same upon the shafts, and movable links connecting the bars C C to the springs E E, substantially as shown.

JAMES H. BLACKMORE.

Witnesses:
 PERY E. HELFMAN,
 FRANK B. SITES.